April 14, 1925.
R. E. SCHURTZ
NONRETURN VALVE
Original Filed Dec. 20, 1918
1,533,144
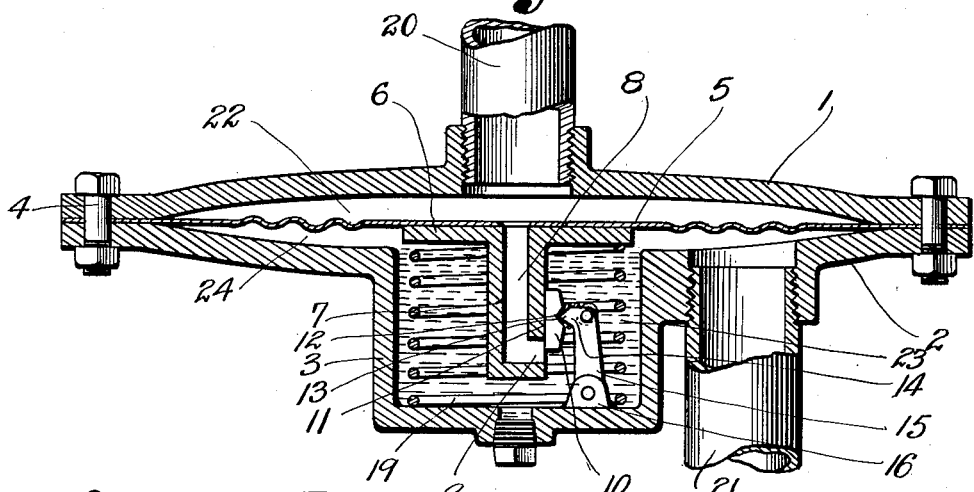
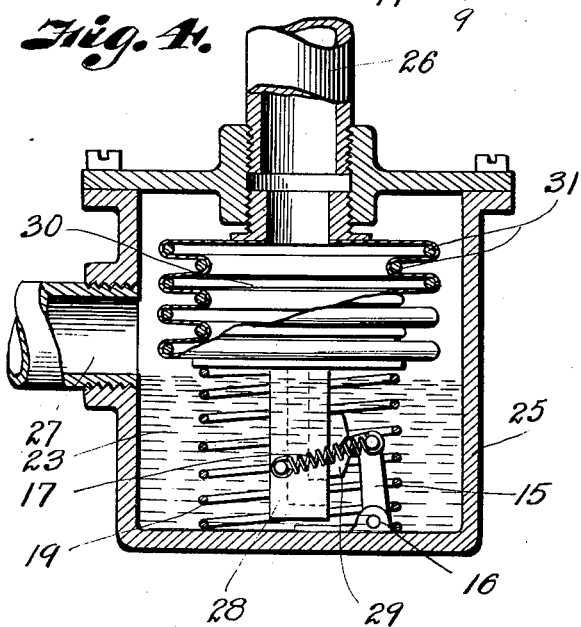
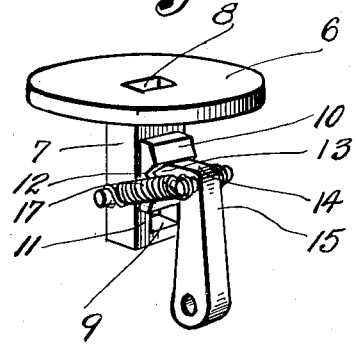
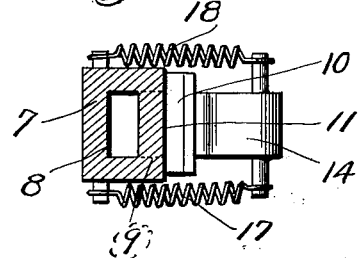
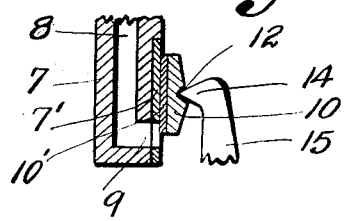
INVENTOR
Ralph E. Schurtz
BY
ATTORNEY Patented Apr. 14, 1925.

1,533,144

UNITED STATES PATENT OFFICE.

RALPH E. SCHURTZ, OF KANSAS CITY, MISSOURI.

NONRETURN VALVE.

Original application filed December 20, 1918, Serial No. 267,614. Divided and this application filed September 21, 1923. Serial No. 664,014.

*To all whom it may concern:*

Be it known that I, RALPH E. SCHURTZ, a citizen of the United States, residing at Kansas City, in the county of Jackson and State of Missouri, have invented certain new and useful Improvements in Nonreturn Valves; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to pressure regulated non-return valves and the primary object of the invention is to provide a non-return valve which will move in response to differential pressures to uncover a port to admit a fluid such as gas through the port on one side of the valving element which will prevent the return of the gas passing through the valve, the valve being so constructed that whenever the pressure on the inlet side of the valve exceeds the pressure on the outlet side, the valving element will uncover the port and whenever the pressure on the outlet side of the valve reaches a determined value, the valve will cover the port, therefore the valve is essentially a uniflow valve. The valve mechanism is particularly designed for use in connection with refrigerating machines of the absorption type, such for example as is shown in an application filed by me on or about December 20, 1918, Serial No. 267,614 of which the present application is a division.

One of the difficulties in constructing a properly operating absorption type of refrigerating apparatus is due to the difficulty in controlling the flow of the ammonia, or other gaseous medium, that is to provide a valve that will actually close off the vapors and prevent back leak in the system. Such a valve should be capable of resisting corrosion and erosion, so in order to provide a valve of the highest efficiency, I have shown the outlet side of the valve port submerged in a liquid so as to provide a liquid seal in addition to the mechanical seal provided by the movable valve element. The valve element, that is the element which closes the port opening is a sliding element adapted to intimately bear against the element with which it co-operates, as I have found a sliding contact is more efficient as a sealing means than is possible with a lift valve and in order to prevent deterioration by corrosion or erosion, I face the valving elements of non-corrosive material, for example "stellite" which is a metal particularly adapted for use in connection with my invention, although I do not wish to be limited necessarily to the use of stellite as other metals may be substituted, the essential characteristics of the metal used, however must be that it is non-corrodible and not subject to erosion.

In the following description, I shall describe the valve mechanism as applied to an absorption type of refrigerating apparatus because it is particularly designed for use with an absorption type of refrigerating apparatus but it is possible to use it in other connections so I do not want to be unnecessarily limited in the application of my invention. A comprehensive disclosure of the invention will be found in the following description in connection with the accompanying drawings, in which:

Fig. 1 is a vertical longitudinal sectional view through a non-return valve mechanism constructed in accordance with my invention.

Fig. 2 is a detailed perspective view of two co-operating valve members.

Fig. 3 is a cross sectional view through the ported member and a top plan view of the port closing member showing the spring for holding the two members in intimate contact.

Fig. 4 is a view partly in section and partly in elevation of a slightly modified form of valve mechanism, and Fig. 5 is a partial sectional view of the valving members.

In the preferred embodiment of my invention the valve casing is shown as comprising two members 1 and 2 the member 1 being a cover for the member 2 which is provided with a recess or cup-shaped portion 3, the two members being secured together by bolts 4 and between them is a diaphragm 5. The diaphragm carries a ported member comprising a disc 6 having a depending elongated tubular centrally located ported member 7 with an inlet end 8 at the top and a transverse outlet 9 in the side. The port closing valve member 10 bears against the flat face 11 of the member 7. The member 7 and the valving or port closing members 10 are faced with material 7' and 10' which is non-corrodible and not subject to erosion preferably stellite, which I recommend for its non-corrodible quality and because of its wearing quality. Intermediate the ends of the valve block or member 10 is a notch 12 in which rests the knife edge 13 of the short arm 14 of an elbow lever 15 pivoted to a bracket 16 in the bottom of the recess portion 3. The knife edge is held in the notch by two tension springs 17 and 18 which are anchored to the lever 14 and to the tube 7 so that the block 10 will be held in intimate contact with the face 11 of the member 7 on which it slides. The recess or cup 3 carries a coil expansion spring 19, one end of which bears against the bottom of the cup 3 and the other bears against the under face of the disc 6 so as to support the disc 6 and member 7 in equilibrium, that is to take the weight off of the disc 5 so that a slight differentiation in pressure on either side of the diaphragm will cause it to move and actuate the movable member consisting of the element 6 and 7. By reference to Fig. 1, it will be observed that the casing has an inlet pipe 20 and an outlet pipe 21. Therefore if the device is attached to an absorption type of refrigerating machine anhydrous ammonia or other vapors may enter through the pipe 20 and exert pressure in the space 22 above the diaphragm 5 to cause it to depress so that the member 7 will slide on the block 10 destroying the lap of the block across the outlet end 9 of the ported member 7 then anhydrous ammonia or other fluid may discharge through the ported member 7 and pass through the liquid seal 23 in cup 3 and out through the pipe 21 into a condenser and from the condenser to an accumulator or storage tank in a well understood manner. When enough fluid has passed through the member 7 to cause the pressure in the space 24 beneath the diaphragm 5 to reach a predetermined value, the expansive force of the spring 19 will cause the diaphragm to move toward the cover 1, causing the block 10 to lap opening 9 closing off communication between the inlet side and the outlet side of the valve casing. The ported member 7 will be closed so long as the fluid and spring pressure on the underside of the diaphragm is in excess of the fluid pressure on the upper side of the diaphragm. When the pressure on the outlet side of the valve casing exceeds the pressure on the inlet side, the diaphragm may be forced up into intimate contact with the underfacing of the cover 1 and since the rigid disc 6 is of greater diameter than the pipe 20 it is observed that the diaphragm will not be put under strain, therefore the effective utility will be maintained for a considerable period.

It will be observed that the ported member moves longitudinally while the block 10 is practically stationary, the only movement being a slight rocking movement to maintain intimate contact with the face 11 of the ported member 7. The intimate contact between the members 7 and 11 being maintained by the springs 17 and 18 and since the discharge end of the member 7 is submerged in the liquid 23 which provides a liquid seal the possibility of back leakage is practically nil.

In Fig. 4 I have shown a slightly modified form of my invention in which the casing 25 has an inlet 26 and an outlet 27. A member 28 corresponding to member 7 and block 29 corresponding to block 10 and its appurtenances co-operates with the member 28. The member 28 is connected to the upper casing by a bellows diaphragm 30, the folds of the bellows being maintained in proper relation by the rings 31.

In other respects the construction shown in Fig. 4 is practically the same as that shown in Fig. 1.

What I claim and desire to secure by Letters-Patent is:

1. A non-return valve comprising a casing, a diaphragm dividing the casing into an inlet chamber and an outlet chamber, a slide valve mechanism for communicating the two chambers upon preponderating pressure in the inlet chamber and closing off communication upon the preponderating pressure in the outlet chamber.

2. A non-return valve comprising a casing, a diaphragm dividing the casing into an inlet chamber and an outlet chamber, a slide valve member connected to the diaphragm, a co-operating slide valve member, the two slide valve members being effective to intermittently establish communication between the two chambers when pressure on one side of the diaphragm preponderates over pressure on the other side of the diaphragm and vice versa.

3. A non-return valve comprising a casing, a diaphragm dividing the casing into an inlet chamber and an outlet chamber, a slide valve member connected to the diaphragm, a co-operating slide valve member, the two slide valve members being effective to intermittently establish communication between the two chambers when pressure on one side of the diaphragm preponderates over pressure on the other side of the diaphragm and vice versa, said valve members consisting of non-corrosive material.

4. A non-return valve comprising a casing, a slide valve mechanism in the casing comprising two members having relative movement, one of the members having a port adapted to be lapped by the other member, a diaphragm dividing the casing into two chambers and actuating the movable member whenever pressure on one side of the diaphragm preponderates over the other side of the diaphragm.

5. A non-return valve comprising a casing, a slide valve mechanism in the casing comprising two members having relative movement, one of the members having a port adapted to be lapped by the other member, a diaphragm dividing the casing into two chambers and actuating the movable member whenever pressure on one side of the diaphragm preponderates over the other side of the diaphragm and a liquid seal on the outer side of the ported member.

6. A non-return valve comprising a casing divided into two compartments, a bellows diaphragm in the casing, movable in response to differential pressures in the two compartments and a valve mechanism for establishing communication between the two compartments when the bellows diaphragm moves in one direction and for cutting off communication in the two compartments when the bellows diaphragm moves in the opposite direction.

7. A non-return valve comprising a casing, a diaphragm in the casing dividing the casing into two compartments, a ported member carried by the diaphragm and actuated by the diaphragm upon differential of pressures in the compartments, a valving member for lapping one end of the port in the ported member.

8. A non-return valve comprising a casing, a diaphragm in the casing dividing the casing into two compartments, a ported member carried by the diaphragm and actuated by the diaphragm upon differential of pressures in the compartments, a valving member for lapping one end of the port in the ported member, the last named member having a relatively fixed position.

9. A non-return valve comprising a casing, a diaphragm in the casing dividing the casing into two compartments, a ported member carried by the diaphragm and actuated by the diaphragm upon differential of pressures in the compartments, a valving member for lapping one end of the port in the ported member, the last named member having a relatively fixed position and means for maintaining the last named member in intimate contact with the ported member.

In testimony whereof I affix my signature.

RALPH E. SCHURTZ.